United States Patent

Bos

[11] Patent Number: 5,914,815
[45] Date of Patent: Jun. 22, 1999

[54] OPTICAL REARVIEW SYSTEM FOR VEHICLE

[75] Inventor: Brent J. Bos, Tucson, Ariz.

[73] Assignee: Donnelly Corporation, Holland, Mich.

[21] Appl. No.: 08/921,160

[22] Filed: Aug. 29, 1997

[51] Int. Cl.$^6$ ........................................... B60R 1/08
[52] U.S. Cl. ........................... 359/571; 359/838; 359/871
[58] Field of Search .................... 359/565, 566, 359/838, 872, 871, 402, 571

[56] References Cited

U.S. PATENT DOCUMENTS

| | | | |
|---|---|---|---|
| 3,441,335 | 4/1969 | Johnson | 359/857 |
| 3,809,462 | 5/1974 | Baumgardner et al. | 359/861 |
| 4,988,152 | 1/1991 | Wreede | 359/839 |
| 5,278,695 | 1/1994 | Gebelein et al. | 359/419 |
| 5,559,640 | 9/1996 | Vachss et al. | 359/838 |
| 5,594,593 | 1/1997 | Milner | 359/726 |
| 5,617,245 | 4/1997 | Milner | 359/402 |

FOREIGN PATENT DOCUMENTS

| | | | |
|---|---|---|---|
| 0283467 A1 | 9/1988 | European Pat. Off. | 359/838 |
| 2263453 | 7/1993 | United Kingdom | 359/872 |

OTHER PUBLICATIONS

G. J. Swanson, "Binary Optics Technology: The Theory and Design of Multi–Level Diffractive Optical Elements", Technical Report 854, M.I.T. Lincoln Laboratory, Lexington, MASS., pp. 1–47, Aug. 1989.

*Primary Examiner*—Cassandra Spyrou
*Assistant Examiner*—John Juba, Jr.
*Attorney, Agent, or Firm*—Van Dyke, Gardner, Linn & Burkhart, LLP

[57] ABSTRACT

An optical rearview system for a vehicle includes a reflective element which reflects light incident thereon and at least one diffraction grating in the path of light from an object rearward of the vehicle towards the reflective element. The at least one diffraction grating diffracts light from the object wherein light passing through the diffraction grating is directed towards the reflective element. Such optical rearview system eliminates secondary reflections and flare which have precluded successful commercialization of previously known optical rearview systems.

16 Claims, 2 Drawing Sheets

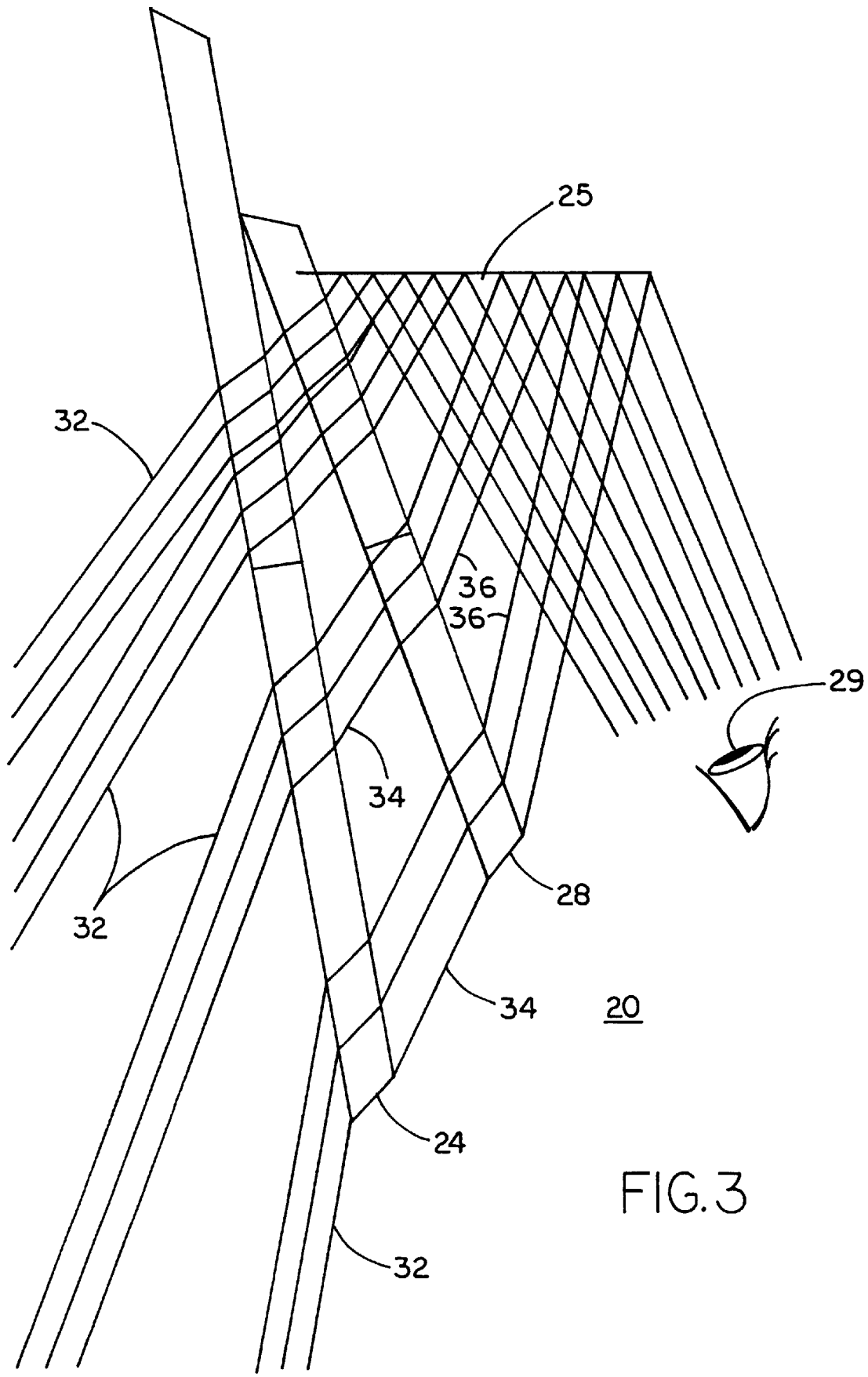

OPTICAL REARVIEW SYSTEM FOR VEHICLE

BACKGROUND OF THE INVENTION

This invention relates generally to vehicle rear vision systems and, in particular, to a rear vision system made up of optical elements.

In U.S. Pat. Nos. 5,594,593 and 5,617,245 issued to Peter J. Milner, the disclosures of which are hereby incorporated herein by reference, an optical rearview unit for a vehicle is disclosed which substantially reduces protrusions beyond the exterior surface of the vehicle, as compared with existing exterior rearview mirrors, while providing with rearward and lateral fields of view of the vehicle. The optical system spans the body line of the vehicle so that only the outer surface of an objective refractor lies outside the body line. This minimizes the projection of the rearview system laterally of the vehicle and, at the same time, brings the image position inboard so that the observer does not have to divert his, or her, line of sight so far from the straight-ahead position in order to view the image presented by the rearview system as is currently the case with conventional exterior door-mounted rearview mirrors. This is accomplished in the Milner patents by a first refractor optical element which is positioned in the path of light from objects to the rear of the vehicle passing through the refractor element to a reflector member from which the light is reflected towards the driver. A second refractor element is provided for compensating chromatic aberrations introduced into the viewing system by the first refractor element.

While the Milner optical rearview system provides significant advantages over conventional exterior rearview mirrors, several problems have precluded successful commercial utilization of the Milner mirror. In one embodiment of the Milner mirror, one, or both, refractor element is a wedge. The difficulty with the use of the wedge optical element is the production of secondary reflections, such as objects within the passenger compartment which are reflected back into the eyes of the driver. Various attempts have been made at overcoming such secondary reflections including the application of anti-reflection coatings to the optical element. However, even anti-reflective coatings have proven inadequate to satisfactorily overcome such secondary reflections. One possible improvement to overcoming secondary reflections is to replace the wedge with a Fresnel prism. The Fresnel prism effectively divides the wedge into a series of individual prismatic mini-elements. In addition to providing an improvement to secondary reflections, the Fresnel prism is advantageous because it may be made from a plastic material rather than glass and provides more flexibility in system design thereby reducing interference with vehicle body configuration.

However, the Fresnel prism itself introduces additional undesirable consequences in the design of an optical rearview system. One such undesirable consequence is the production of "flare" which is a spread or smear of light superimposed over a normal image especially in high contrast conditions such as those occurring at night. Such smear of light is believed to originate from a location outside of the field of view of the rearview system, such as from the side of the vehicle. It is believed that flare results from light sources outside of the field of view of the system contacting the draft surfaces defined by the transition from one Fresnel prismatic mini-element to the next mini-element. Because the eyes of the driver tend to be adapted to low lighting conditions, which is the condition in which such flare often occurs, the presence of an aberration in the form of a spread, or smear, of light superimposed over the normal image is exceptionally undesirable and annoying.

SUMMARY OF THE INVENTION

The present invention provides an improvement to the Milner mirror in a manner which avoids the difficulties which heretofore have prevented successful commercialization of the Milner mirror.

An optical rearview system for a vehicle according to the invention includes a reflective element which reflects light incident thereon and at least one diffraction grating. The diffraction grating is in the path of light from an object rearward of the vehicle towards the reflective element. The diffraction grating diffracts light from the object such that light passing through the diffraction grating is directed towards the reflective element.

In a preferred embodiment, an optical rearview mirror system includes first and second transmission optical elements. Each of the optical elements diffracts and directs light passing through that optical element into substantially a single order of light. The first optical element is positioned in the path of light from an object rearward of the vehicle towards a reflective element. In this manner, light passing through the first optical element is directed towards the reflective element. The second optical element is for compensating chromatic aberrations introduced by the first optical element.

Diffraction gratings operate on a different principle from refractive prisms. Diffraction gratings utilize a series of parallel grooves that are spaced apart a distance that is the same order of magnitude as the wavelength of light transmitted therethrough. The diffraction grating bends light passing therethrough and thereby achieves the same result as the refraction optical element in the Milner mirror patents, but does not suffer the difficulties set forth above. This is believed to be the result of the absence of draft surfaces of substantial size as known to be present with refraction elements.

Preferably, each optical element is a blazed diffraction grating. A blazed diffraction grating utilizes diffraction to direct substantially all light being transmitted therethrough into a single order which is typically either the −1 or +1 order. By directing substantially all of the light being transmitted therethrough into a single order, the blazed diffraction grating is exceptionally efficient. However, other types of diffraction gratings may be utilized.

These and other objects, advantages and features of this invention will become apparent upon review of the following specification in conjunction with the drawings.

BRIEF DESCRIPTION OF THE DRAWINGS

FIG. 3 is a schematic diagram of an optical rearview mirror system according to the invention.

DESCRIPTION OF THE PREFERRED EMBODIMENT

Figure 1:
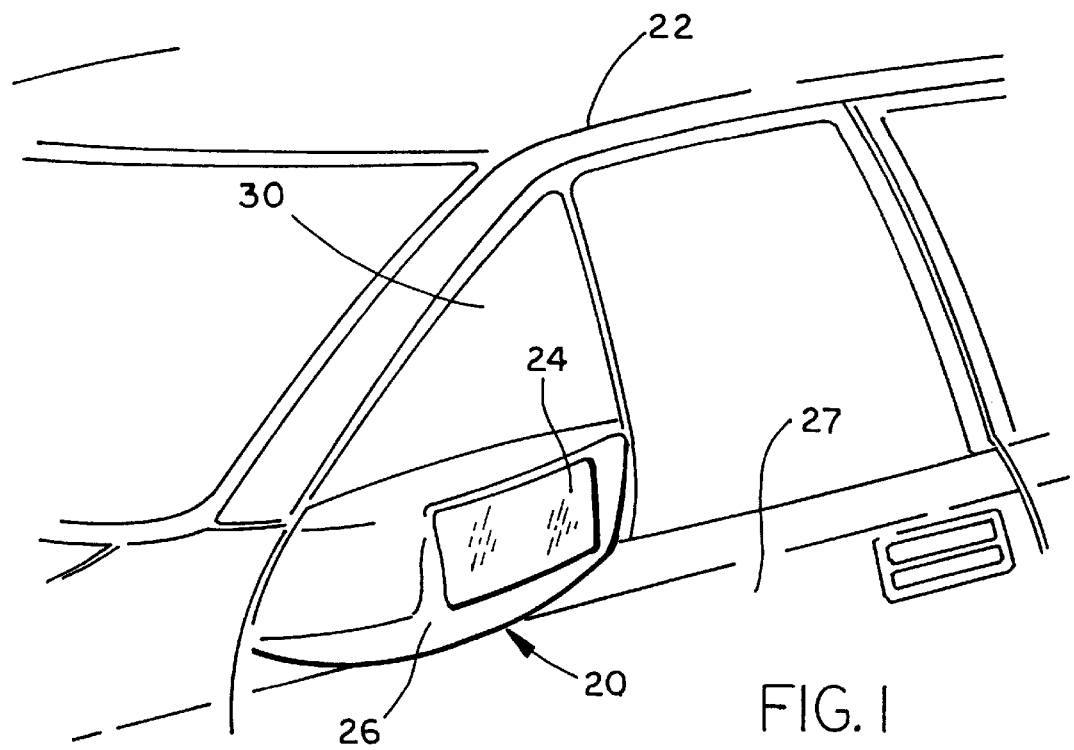
FIG. 1 is a perspective view of a side of a vehicle equipped with an optical rearview system according to the invention.
Figure 2:
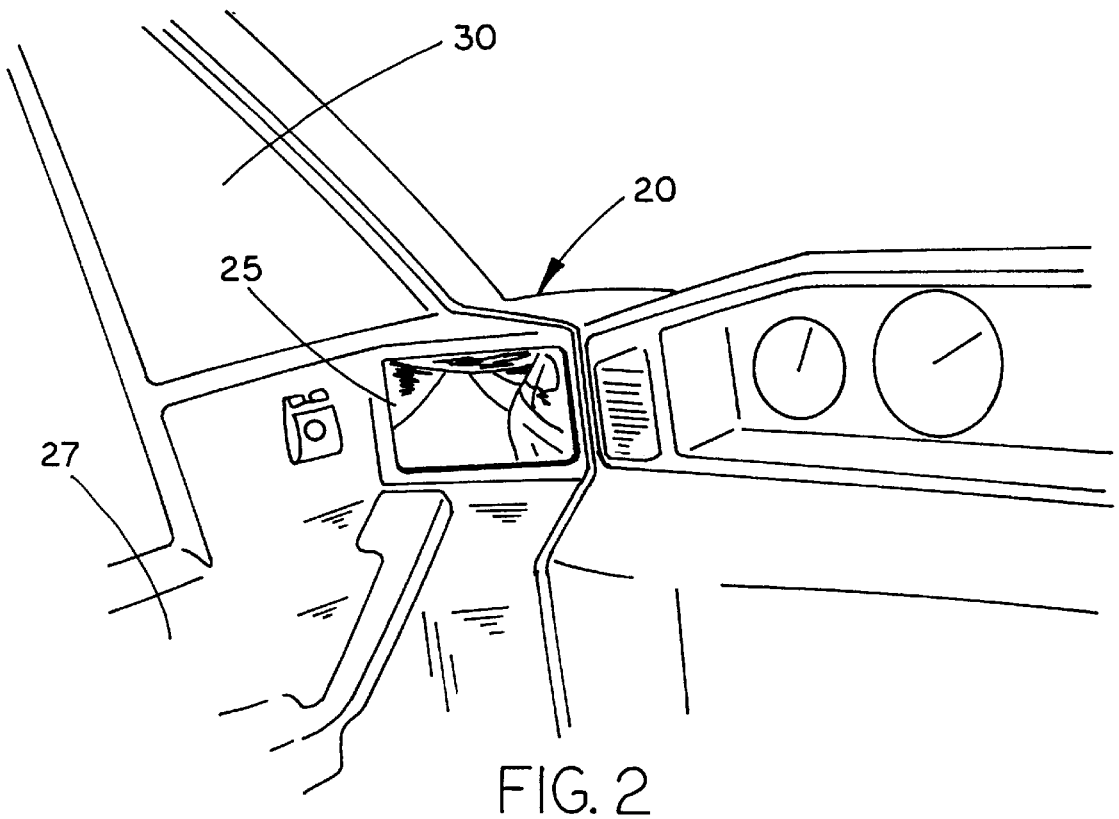
FIG. 2 is a perspective view of the interior of the vehicle in FIG. 1 from a position viewed by the driver of the vehicle of the optical rearview system.

Referring now specifically to the drawings, and the illustrative embodiments depicted therein, optical rearview mirror system 20, as illustrated in FIGS. 1 and 2, includes an outer portion surrounded by a cowling 26 which extends beyond the door 27 of vehicle 22 and may be positioned below a windowpane 30. An objective optical element 24, which is a diffraction grating element, is positioned within cowling 26 external of the vehicle. A reflective element 25 extends within the interior of the vehicle and is positioned in door 27. Because of this arrangement, optical rearview system 20 protrudes outwardly beyond the outer surface of door 27 substantially less than the conventional exterior rearview mirror, while the image produced at reflective element 25 protrudes within the interior compartment of the vehicle, where the image is more readily observed by eyes 29 of the driver.

Objective diffraction optical element 24 of optical rearview mirror system 20 is positioned in the path of light rays 32 projected from an object (not shown) located to the rear and side of the vehicle 22 (FIG. 3). Objective diffraction optical element 24 redirects rays 32 into redirected rays 34. A second diffraction optical element 28 is a compensating diffraction optical element which compensates for chromatic aberrations introduced into the system by objective optical element 24. Chromatic-compensated rays 36 emanating from compensating diffraction optical element 28 are reflected by reflective element 25 and the reflective rays 38 are observed by the eyes 29 of the driver. Because both optical elements 24 and 28 are positioned in the optical path between the object rearward of the vehicle and reflective element 25, the illustrated optical rearview system 20 is a double-objective optical system. However, it should be understood that compensating diffraction optical element 28 may be in the path of light from the reflector to the drive or in any other arrangement as illustrated in the above-mentioned Milner patents. It should be understood that reflective element 25 can be selectively positioned either manually or utilizing drive motors about both vertical and horizontal axes in order to provide adjustment to suit the size and seat position of the drive utilizing conventional techniques such as a dual-axis motorized mirror actuator.

Optical elements 24 and 28 are transmission diffraction gratings. As is known in the art, such diffraction gratings redirect light from its optical path because a series of parallel grooves are spaced apart on the order of magnitude of the wavelength of the light being transmitted therethrough. A pure diffraction grating produces diffracted light having primarily three spectral orders including the 0 order, the +1 order and the −1 order. However, a blazed, or triangular tooth, diffraction transmission grating utilizes both refraction and diffraction to redirect the light into a single order; namely, the +1 or −1 order. Because all of the light is directed into a single order, a blazed diffraction grating is more efficient and more preferred to other types of diffraction gratings. In the illustrated embodiment, optical elements 24 and 28 may be blazed diffraction transmission gratings of the type provided by Richardson Grating Laboratory. Other diffraction gratings may be used, such as holographic, or the like. In order to provide satisfactory operation, the parallel grooves which define the diffraction grating are preferably separated with a distance that is greater than approximately 0.5 micrometers and less than approximately 40 micrometers although other separation distances may have the desired effect. Most preferably, the separation between the grooves is in the range of between approximately 1 micrometer and approximately 10 micrometers.

Although the invention is illustrated utilizing a separate second compensating diffraction optical element, it may be possible to combine the chromatic compensating function of the second optical element into the first optical element and thereby eliminate the need for a second optical element. This may be accomplished by applying the diffraction grating to the first surface and/or the second surface of the single objective diffraction optical element and providing optical magnification to the element by providing curvature to one or more of the surfaces of the optical element. The ability to carry out the invention utilizing a single optical element would provide a significant reduction in cost and complexity as would be apparent to the skilled artisan.

A diffraction grating according to the invention can be formed out of a plastic material such as polycarbonate or the like. The diffraction grating can be made according to the principles disclosed in commonly assigned U.S. Pat. No. 5,538,674 issued to Jon Nisper for a METHOD FOR REPRODUCING HOLOGRAMS, KINOFORMS, DIFFRACTIVE OPTICAL ELEMENTS AND MICROSTRUCTURES, the disclosure of which is hereby incorporated herein by reference.

By providing a diffraction grating in an optical rearview system, the present invention produces a crisp and clear image of objects to the rear and side of the vehicle without aberrations which have precluded previous commercialization of such systems even in high contrast, low light conditions. This is accomplished in a manner which does not add additional optical elements to the system and which does not require significantly more expensive components than previously proposed. Accordingly, the present invention provides a useful advance in the art.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. An optical rearview system for a vehicle, comprising:
   a reflective element which reflects light incident thereon; and
   at least one diffraction grating for cooperating to produce an image of an object rearward of the vehicle substantially without flare in the form of a spread or smear of light superimposed thereon, said at least one diffraction grating being in the path of light from an object rearward of the vehicle towards the reflective element,
   said at least one diffraction grating diffracting light from the object wherein light passing through the at least one diffraction grating is directed towards the reflective element.

2. The optical rearview system in claim 1 wherein said at least one diffraction grating includes two diffraction gratings, one of said diffraction gratings for compensating chromatic aberrations introduced by the other of said diffraction gratings.

3. The optical rearview system in claim 2 wherein said two diffraction gratings are both in the path of light from an object rearward of the vehicle towards the reflective element.

4. The optical rearview system in claim 2 wherein each of said diffraction gratings is a blazed diffraction grating.

5. The optical rearview system in claim 2 wherein each said diffraction grating is made up of a series of parallel grooves periodically spaced apart in order to diffract light passing through said diffraction grating, wherein said grooves are spaced apart in the range of between approximately 0.5 micrometers and approximately 40 micrometers.

6. The optical rearview system in claim 5 wherein said grooves are spaced apart in the range of between approximately 1 micrometer and approximately 10 micrometers.

7. The optical rearview system in claim 1 wherein said at least one diffractive grating is a blazed diffractive grating.

8. The optical rearview system in claim 7 wherein said at least one diffraction grating is made up of a series of parallel grooves periodically spaced apart in order to diffract light passing through said diffractive grating, wherein said grooves are spaced apart in the range of between approximately 0.5 micrometers and approximately 40 micrometers.

9. The optical rearview system in claim 8 wherein said grooves are spaced apart in the range of between approximately 1 micrometer and approximately 10 micrometers.

10. An optical rearview system for a vehicle, comprising:
- a reflective element which reflects light incident thereon positioned forward of the vehicle driver; and
- first and second transmission optical elements for diffracting light passing through that optical element into substantially a single order of light, and for cooperating to produce an image of an object rearward of the vehicle substantially without flare in the form of a spread or smear of light superimposed thereon;
- said first optical element being in the path of light from an object rearward of the vehicle towards the reflective element wherein light passing through said first optical element is directed towards the reflective element;
- said second optical element compensating chromatic aberrations introduced by the first optical element.

11. The optical rearview system in claim 10 wherein said second optical element is in the path of light from an object rearward of the vehicle towards the reflective element.

12. The optical rearview system in claim 10 wherein each of said optical elements is a blazed diffraction grating.

13. The optical rearview system in claim 12 wherein each of said optical elements is made up of a series of parallel grooves periodically spaced apart in order to refract and diffract light passing through that optical element, wherein said grooves are spaced apart in the range of between approximately 0.5 micrometers and approximately 40 micrometers.

14. The optical rearview system in claim 13 wherein said grooves are spaced apart in the range of between approximately 1 micrometer and approximately 10 micrometers.

15. The optical rearview system in claim 10 wherein each of said optical elements is made up of a series of parallel grooves periodically spaced apart in order to refract and diffract light passing through that optical element, wherein said grooves are spaced apart in the range of between approximately 0.5 micrometers and approximately 40 micrometers.

16. The optical rearview system in claim 15 wherein said grooves are spaced apart in the range of between approximately 1 micrometer and approximately 10 micrometers.

* * * * *